(12) United States Patent
Snyder et al.

(10) Patent No.: US 11,155,030 B2
(45) Date of Patent: Oct. 26, 2021

(54) FLUID DELIVERY SYSTEM FOR A PRINTING SYSTEM

(71) Applicant: 3D Systems, Inc., Rock Hill, SC (US)

(72) Inventors: Keaton Jonathan Daniel Snyder, Donald, OR (US); Richard I. Lane, Blend, OR (US)

(73) Assignee: 3D Systems, Inc., Rock Hill, SC (US)

(*) Notice: Subject to any disclaimer, the term of this patent is extended or adjusted under 35 U.S.C. 154(b) by 544 days.

(21) Appl. No.: 16/191,702

(22) Filed: Nov. 15, 2018

(65) Prior Publication Data

US 2019/0152141 A1 May 23, 2019

Related U.S. Application Data

(60) Provisional application No. 62/587,918, filed on Nov. 17, 2017.

(51) Int. Cl.
| | |
|---|---|
| *B29C 64/209* | (2017.01) |
| *B29C 64/106* | (2017.01) |
| *B29C 64/25* | (2017.01) |
| *B33Y 50/02* | (2015.01) |
| *B33Y 30/00* | (2015.01) |
| *B33Y 10/00* | (2015.01) |
| *B33Y 40/00* | (2020.01) |
| *B29C 64/321* | (2017.01) |
| *B29C 64/393* | (2017.01) |

(52) U.S. Cl.
CPC .......... *B29C 64/209* (2017.08); *B29C 64/106* (2017.08); *B29C 64/25* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/209; B29C 64/393; B29C 64/106; B29C 64/25; B29C 64/321; B33Y 50/02; B33Y 40/00
See application file for complete search history.

(56) References Cited

U.S. PATENT DOCUMENTS

| | | | |
|---|---|---|---|
| 3,110,537 A | 11/1963 | Poetzsh et al. | |
| 6,649,829 B2 | 11/2003 | Garber et al. | |
| 7,394,375 B2 | 7/2008 | Johnson | |
| 8,517,749 B2 | 8/2013 | Marshall | |
| 8,926,484 B1 * | 1/2015 | Comb | B29C 64/209 483/16 |
| 2014/0265049 A1 * | 9/2014 | Burris | B29C 64/277 264/497 |

* cited by examiner

*Primary Examiner* — Michael M. Robinson

(57) ABSTRACT

A fluid delivery apparatus for a printing system includes a fluid outlet defining an upper fluid flow path. The fluid outlet includes an upper portion, a lower portion, a lateral surface, and an electronic device. The upper and lower portions of the fluid outlet each surround the upper fluid flow path. The lateral surface is between the upper and lower portions. The electronic device is disposed upon the lateral surface and includes a substrate, an information storage device, and a plurality of electrical contact pads. The information storage device stores information pertaining to the fluid delivery apparatus. The plurality of electrical contact pads are disposed upon the substrate and face downwardly to receive upwardly extending pressure contacts.

14 Claims, 8 Drawing Sheets

FLUID DELIVERY SYSTEM FOR A PRINTING SYSTEM

FIELD OF THE INVENTION

This non-provisional patent application claims priority to U.S. Provisional Application Ser. No. 62/587,918, Entitled "FLUID DELIVERY SYSTEM FOR A PRINTING SYSTEM" by Keaton Jonathan Daniel Snyder et al., filed on Nov. 17, 2017, incorporated herein by reference under the benefit of 35 U.S.C. 119(e).

FIELD OF THE INVENTION

The present disclosure concerns a fluid delivery apparatus for a printing system. More particularly, the present disclosure concerns a reliable and efficient method for coupling fluid and information concerning the fluid to the printing system.

BACKGROUND

Printing systems that utilize fluidic consumable materials are in wide use. These include three dimensional (3D) printers that utilize various fluids such as photocurable fluids, liquefied waxes, binder resins, and various treatment fluids. A particular printer platform design can be defined based upon the types of fluids that it employs. With the plethora of printers and fluids available, there is a need to makes sure that a particular printer receives the correct fluids. Installing the wrong fluid into a given printer can adversely affect printer output and even cause substantial damage to the printer itself. Also, there is often a need for a given printing system to adjust print parameters based upon a particular printing fluid that is installed.

BRIEF DESCRIPTION OF THE FIGURES

FIG. 6B illustrates the fluid inlet and fluid outlet in a connected configuration.

SUMMARY

Figure 1:
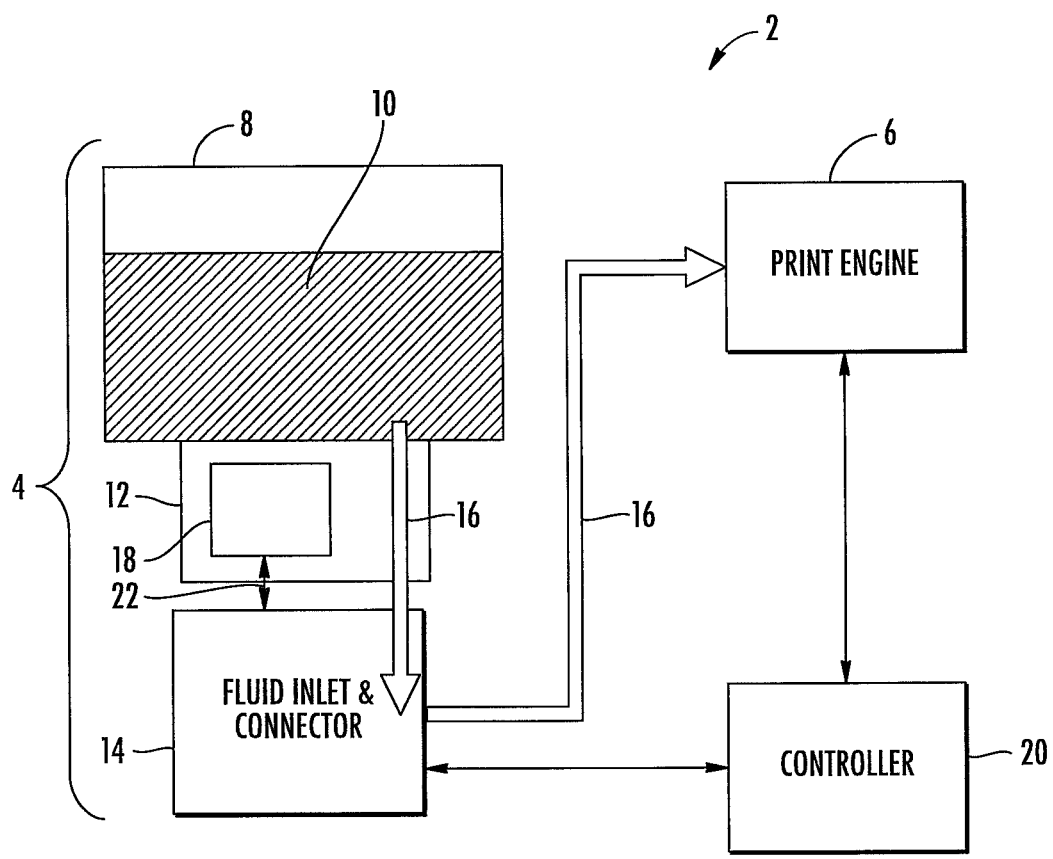
FIG. 1 is a schematic block diagram of an exemplary printing system.

In a first aspect of the disclosure, a fluid delivery apparatus includes a fluid outlet defining an upper fluid flow path. The fluid outlet includes an upper portion, a lower portion, a lateral surface, and an electronic device. The upper and lower portions of the fluid outlet each surround the upper fluid flow path. The lateral surface is between the upper and lower portions. The electronic device is disposed upon the lateral surface and includes a substrate, an information storage device, and a plurality of electrical contact pads. The information storage device stores information pertaining to the fluid delivery apparatus. The plurality of electrical contact pads are disposed upon the substrate and face downwardly to receive upwardly extending pressure contacts.

The fluid delivery apparatus can be described in terms of cylindrical coordinates including Z, R, and θ. A Z-axis is a central axis of the fluid outlet and generally extends along the fluid flow path. The direction +Z is in the direction of fluid flow through and out of the fluid outlet and is referred to as the downward direction. The lateral surface and the contact pads face in the +Z direction and receive an electrical contact force along the Z-axis. The R-axis extends along a radial direction. The value of R is a magnitude of a distance from the central axis Z. The lateral surface is parallel to the R-axis. The angle theta (θ) is an azimuthal angle of rotation about the Z-axis.

In one implementation the upper and lower portions of the fluid outlet are substantially round or cylindrical in shape. They define a larger upper radius and smaller lower radius, respectively. The lateral surface therefore connects a larger upper cylinder to a lower smaller cylinder and therefore is a ring-shaped lateral surface. The lateral surface surrounds the fluid flow path.

In another implementation the substrate is ring-shaped and surrounds the upper fluid flow path. The electrical contact pads are azimuthally distributed around the ring-shaped substrate.

In yet another implementation the substrate is ring-shaped and surrounds the upper fluid flow path. The electrical contact pads are ring-shaped and concentric with each other.

In a further implementation the information storage device has a number of independent leads coupled to the electrical contact pads. At least one of the independent leads is coupled to two or more contact pads to improve a reliability of pressure contacts.

In a yet further implementation the fluid delivery apparatus includes a fluid inlet defining a lower fluid flow path and including a plurality of upwardly (−Z) extending conductive tines. When the fluid outlet is coupled to the fluid inlet (1) the upper fluid flow path couples to the lower fluid flow path and (2) the conductive tines impinge upon the electrical contact pads with an impingement force directed along the Z-axis.

In a second aspect of the invention, a printing system includes a fluid delivery system, a print engine, and a controller. The fluid delivery system includes a fluid container, a fluid outlet, and a fluid inlet. The fluid outlet includes an electronic device. When the fluid outlet is mechanically coupled to the fluid inlet: (1) a fluid flow path is completed from the fluid container, out of the fluid outlet, into the fluid inlet, and to the print engine and (2) an electrical path is established from the electronic device to the controller.

In one implementation the controller includes a processor coupled to an information storage device. The information storage device includes a non-transient or non-volatile storage information device that stores software instructions. When executed by the processor, the software instructions control the print engine and other portions of the printing system.

DETAILED DESCRIPTION OF THE PREFERRED EMBODIMENTS

FIG. 1 is a schematic block diagram of a printing system 2. Printing system 2 can be a three dimensional (3D) printer for printing 3D articles of manufacture. Alternatively, printing system 2 can be a two dimensional (2D) printer for printing on sheet or roll fed media such as paper or plastic.

Printing system 2 includes a fluid delivery apparatus 4 for providing printing fluid to a print engine 6. In one embodiment, print engine 6 is a stereolithography printer that utilizes a photocurable print fluid.

The fluid delivery apparatus 4 includes a fluid container 8 for storing and providing print fluid 10 to the print engine 6. The fluid container 8 includes a fluid outlet 12 that is fluidically and electrically coupled to a fluid inlet 14. As shown by the outlined arrows 16, the print fluid 10 flows out of the fluid outlet 12, into the fluid inlet 14, and to the print engine 6. Thus, the outlined arrows 16 represent a fluid flow path 16 from the fluid container 8 to the print engine 6.

The fluid outlet 12 includes an electronic device 18. Electronic device 18 is for storing and providing information pertaining to the ink container 8. A controller 20 is electrically coupled to the electronic device 18 through the fluid inlet 14. An electrical interface 22 couples the fluid inlet 14 to the electrical device 18.

The controller 20 is also electrically coupled to the print engine 6. The controller reads the information from the electronic device 18. Controller 20 may utilize this information in part to control the print engine 6.

Figure 2:
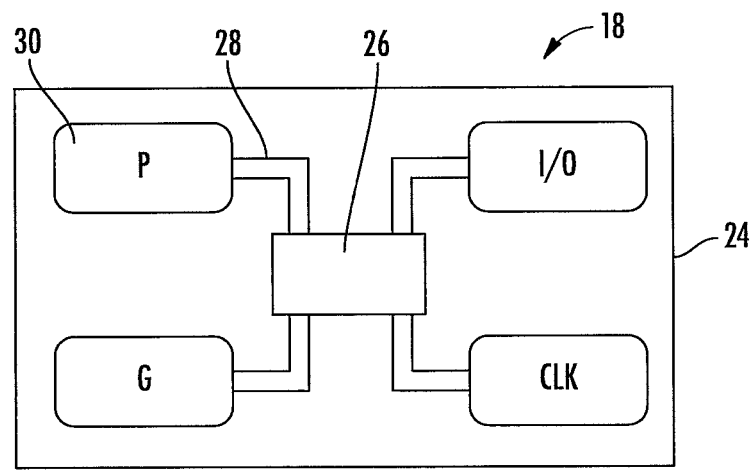
FIG. 2 is a schematic block diagram of an electronic device.

FIG. 2 is a schematic block diagram of an embodiment of an electronic device 18. Electronic device 18 includes a substrate 24. Disposed upon substrate 24 is an information storage device 26, independent electrical leads 28, and contact pads 30. The information storage device 26 can be a semiconductor based memory device 26. In the illustrated embodiment there are four "independent" electrical leads 28. In one embodiment, the four electrical leads can include a power lead (P), a ground lead (G), an input/output data lead (I/O), and a clock lead (CLK) based on a certain standard protocol. In referring to "independent" leads we mean that they cannot be shorted together for a properly functioning memory device 26. In the illustrated embodiment there is one contact pad 30 electrically coupled to each lead. Each contact pad 30 can be gold plated and exposed to allow for a pressure contact with and external electrical connector tine that couples the contact pad to the fluid inlet 14. The remaining portions of the electronic device 18 can be encapsulated with an epoxy or other protective coat to protect leads 28 and information storage device 26.

Figure 3:
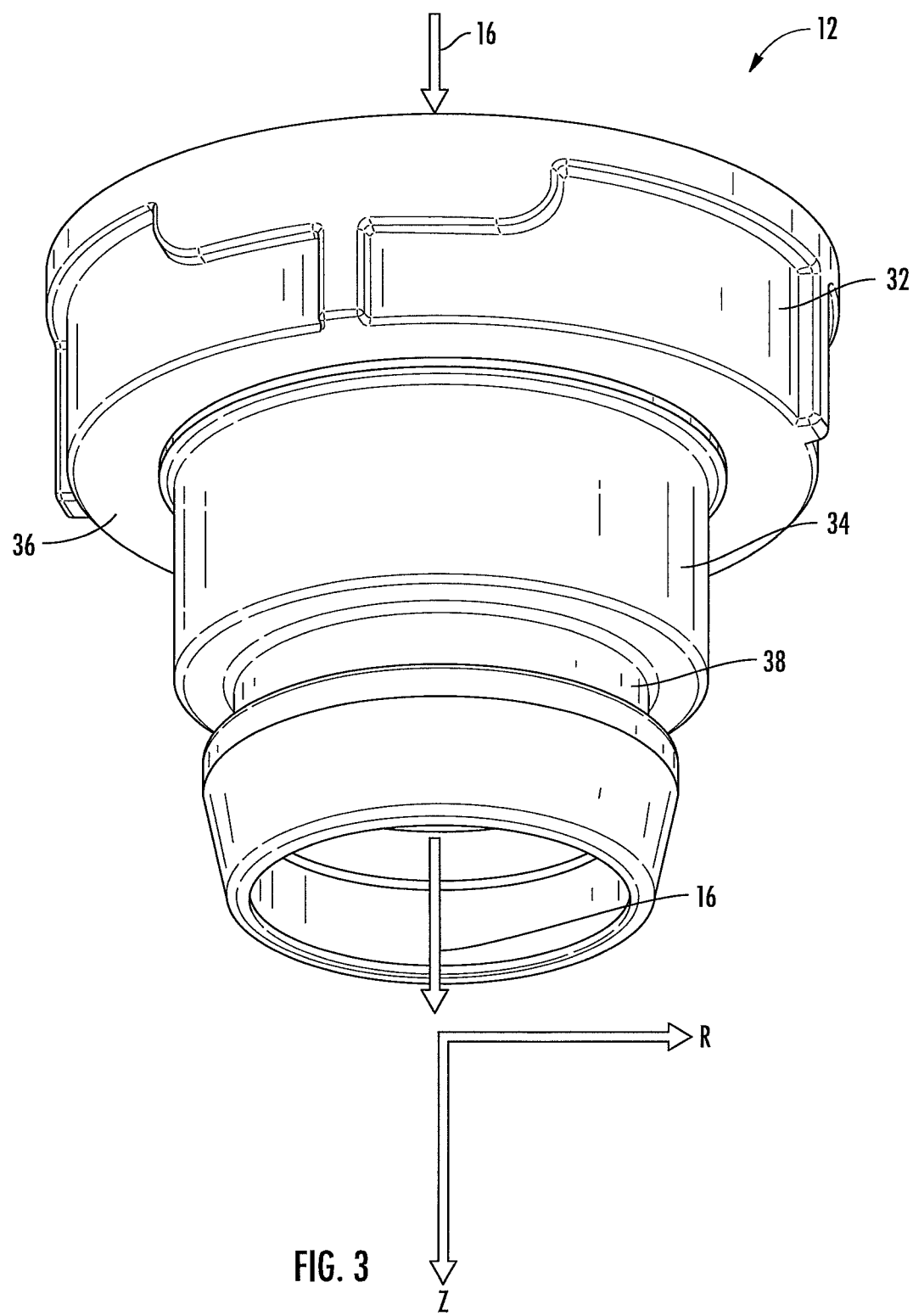
FIG. 3 is an isometric drawing that depicts an exemplary embodiment of a fluid outlet.
Figure 4:
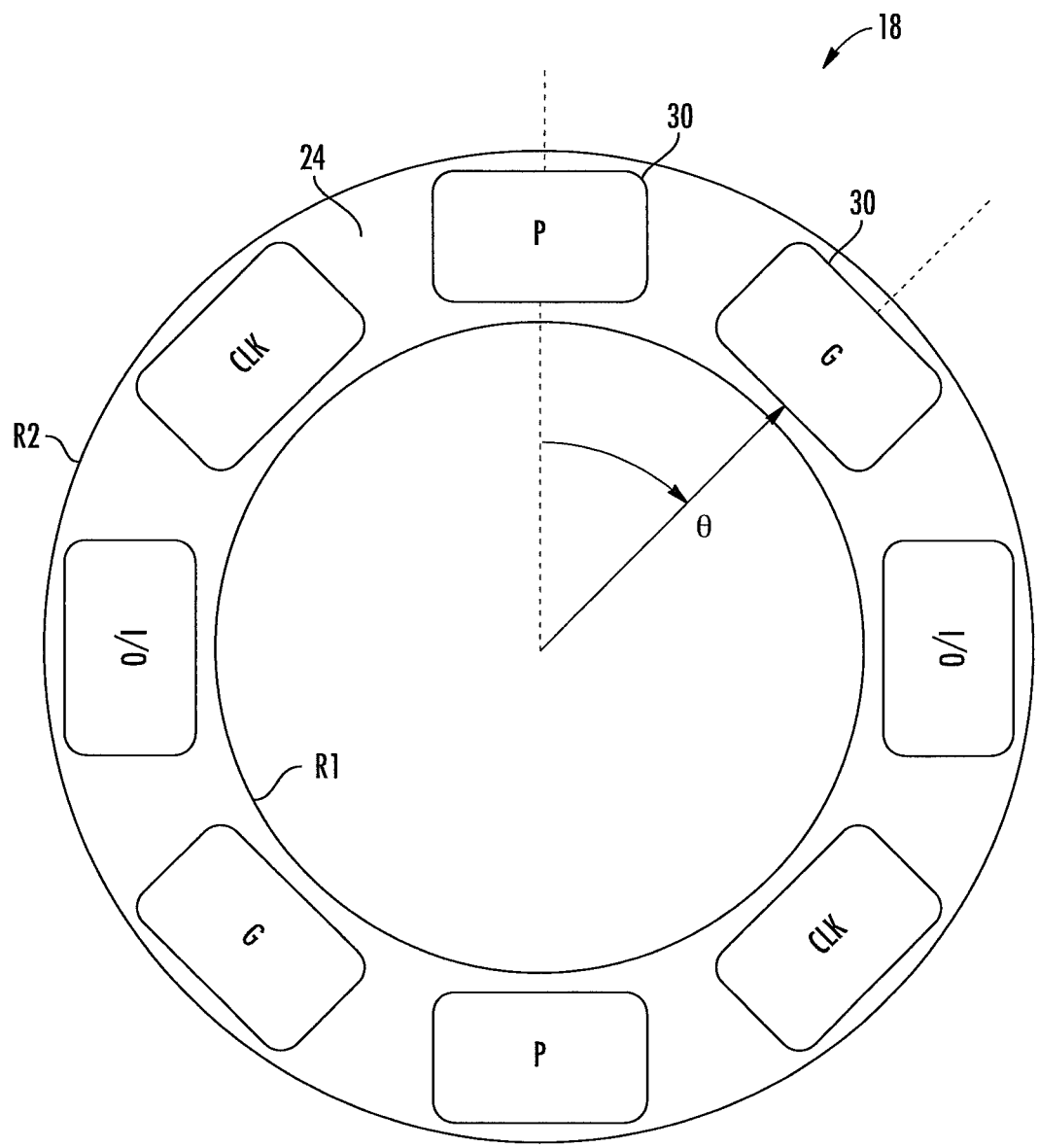
FIG. 4 is a plan view depicting a ring-shaped embodiment of an electronic device.

FIGS. 3, 4, 5, 6A, and 6B illustrate embodiments of the fluid outlet 12 and fluid inlet 14. In describing these embodiments, cylindrical coordinates Z, R, θ and will be used. An axis Z is a vertical axis that is generally central to the fluid outlet 12 and inlet 14 and is generally extends downward in the direction of fluid flow along the fluid flow path 16. A radial axis R extends away from the central axis Z. (See FIG. 3 for an illustration of R and Z). An azimuthal angle θ is illustrated in FIG. 4.

FIG. 3 is an isometric drawing that depicts an exemplary embodiment of a fluid outlet 12 that defines an upper part of fluid flow path 16. Fluid outlet 12 includes an upper portion 32 and a lower portion 34 that each surround the fluid flow path 16. In the illustrated embodiment, the upper portion 32 and the lower portion 34 each have a substantially round or cylindrical shape. Between the upper portion 32 and the lower portion 34 is a ring-shaped lateral surface 36 which faces downwardly and surrounds the fluid flow path 16. The illustrated ring-shaped lateral surface 36 has a radial width that corresponds to a difference in diameter of the upper portion 32 and the lower portion 34. The lower portion 34 also in includes a radially inwardly defined channel 38.

FIG. 4 is a plan view depicting an exemplary ring-shaped embodiment of the electronic device 18. The electronic device 18 includes a ring-shaped substrate 24 that is laterally bound by an inner circle R1 (of radius R1) and an outer circle R2 (of radius R2). The ring-shaped electronic device 18 surrounds the upper part of fluid flow path 16 when it is disposed on ring-shaped lateral surface 36. The substrate 24 also surrounds the upper part of fluid flow path 16.

Disposed upon substrate 24 are a plurality of azimuthally distributed contact pads 30. In the illustrated embodiment the contact pads 30 provide redundant connections for the independent electrical leads 28. Each independent electrical lead 28 has two contact pads that are separated azimuthally by other contact pads. This improves a reliability of the pressure contacts. In the illustrated embodiment, the power (P) lead has two contact pads 30 disposed at approximately θ=zero degrees and θ=180 degrees. The ground (G) lead has two contact pads 30 disposed at approximately θ=45 degrees and θ=225 degrees. The input/output (I/O) lead has two contact pads 30 disposed at approximately θ=90 degrees and θ=270 degrees. The clock (CLK) lead has two contact pads 30 disposed at approximately θ=135 degrees and θ=315 degrees. The contact pads 30 all positioned at a similar radial location but vary azimuthally.

Figure 5:
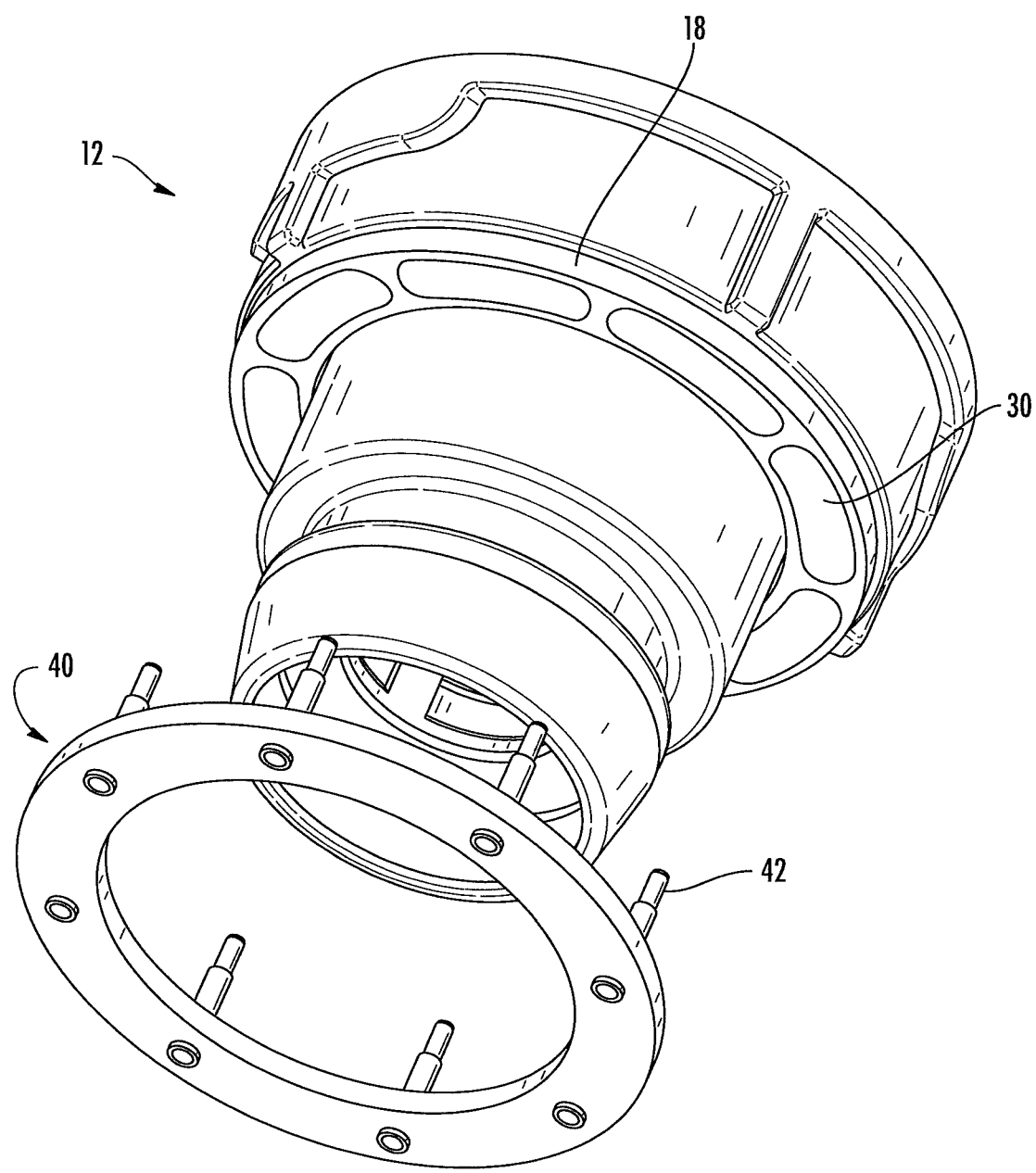
FIG. 5 is an isometric drawing depicting a fluid outlet with an electrical device and an electrical connector that is associated with a fluid inlet.

FIG. 5 is an isometric drawing depicting the fluid outlet 12 and an electrical connector 40 that is to be coupled to the fluid inlet 14. The fluid outlet 12 is similar to the fluid outlet 12 illustrated in FIG. 3 with the addition of the ring-shaped electronic device 18 disposed upon the ring-shaped lateral surface 36. The contact pads 30 face downwardly in the +Z direction and are distributed azimuthally around the fluid flow path.

The electrical connector 40 includes a plurality of conductive tines 42 that extend upwardly in the −Z direction toward the contact pads 30. Each of the conductive tines 42 correspond to one of the contact pads 30.

Figure 6A:
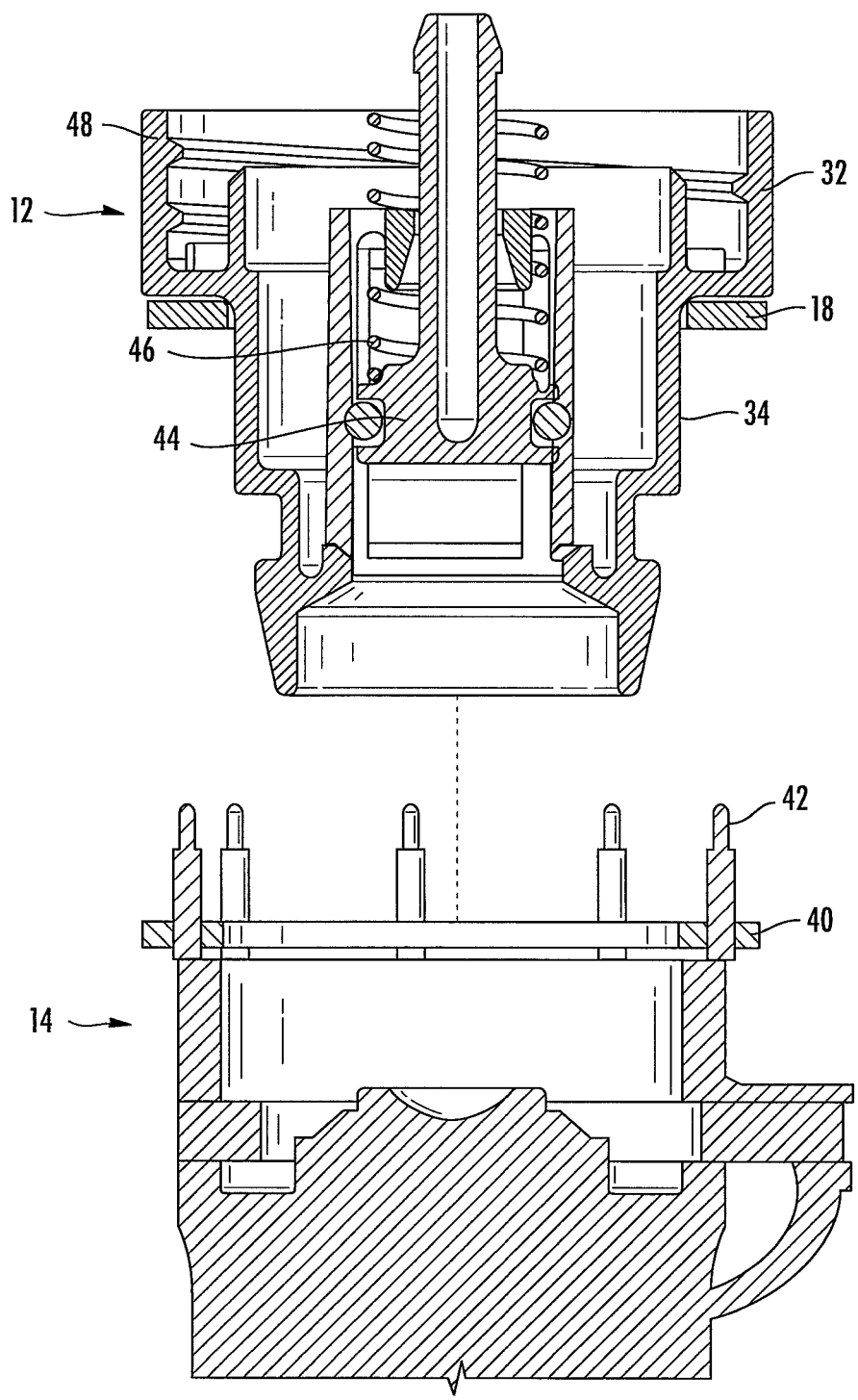
FIG. 6A is an isometric drawing depicting a fluid outlet above a fluid inlet in an unconnected configuration.
Figure 6B:
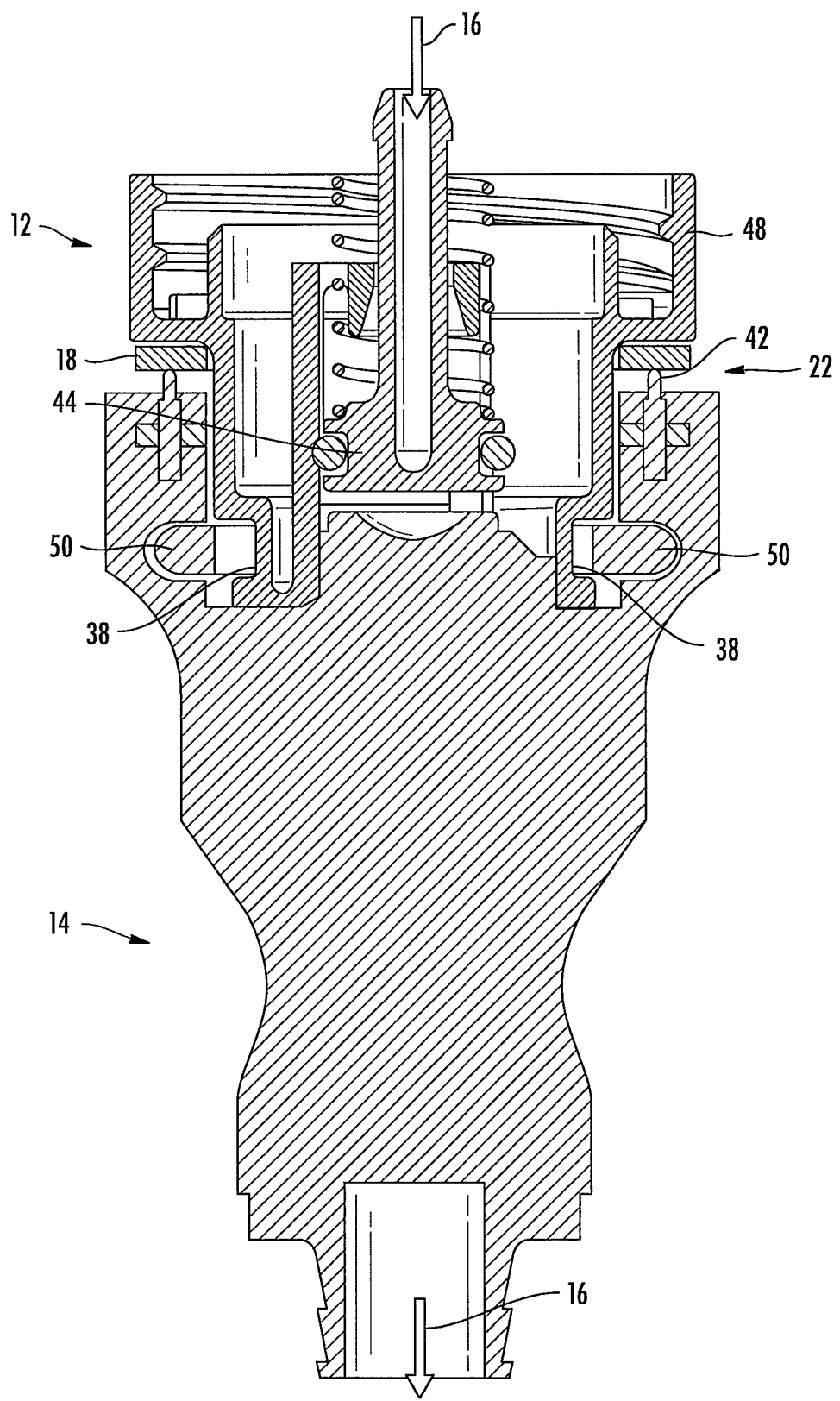
FIG. 6B is an isometric drawing depicting a fluid outlet that is mechanically, electrically, and fluidically coupled to a fluid inlet. Thus

FIGS. 6A and 6B are isometric drawings depicting the fluid outlet 12 and fluid inlet 14 in unconnected (6A) and connected (6B) configurations. The fluid outlet 12 includes a central poppet valve 44 that is urged toward a closed position by a spring 46. The fluid outlet 12 is axially coupled to the fluid inlet 14 by motion along the vertical Z axis that results in three nearly simultaneous actions including fluidic coupling, electrical coupling, and mechanical coupling.

The fluidic coupling occurs when the fluid inlet 14 presses the central poppet value upwardly in the −Z direction relative to the fluid outlet 12 housing 48. This closes the fluid flow path 16 to allow print fluid 10 to flow from the container 8, through the fluid outlet 12, and into the fluid inlet 14 before reaching print engine 6.

The electrical coupling occurs when the conductive tines 42 impinge axially (along Z) with the contact pads 30. Then the information storage device 26 is coupled to the controller 20 through the electrical interface 22 (which includes the electrical connector 40 and the contact pads 30).

The mechanical coupling secures the fluid outlet 12 the fluid inlet 14. This occurs when latch features 50 radially engage channel 38 (see also FIG. 3).

Figure 7:
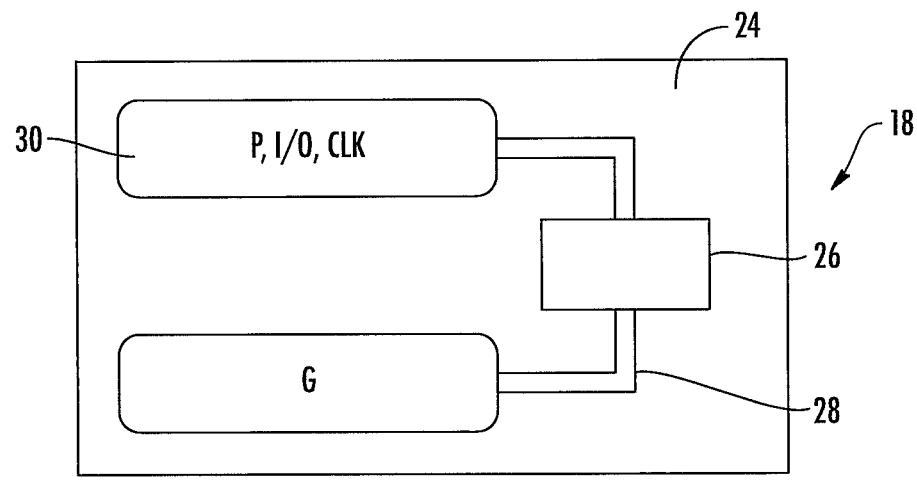
FIG. 7 is a schematic block diagram view of an alternative embodiment of a "two-wire" electronic device.

FIG. 7 is a schematic block diagram view of an alternative embodiment of the electronic device 18. The information storage device 26 has two independent leads 28. In one embodiment, the protocol allows a single lead 28 to provide power, input/output, and clocking signals. The illustrated electronic device 18 of FIG. 7 will be referred to as a "two-wire" electronic device 18 because it operates with a "two wire protocol."

Figure 8:
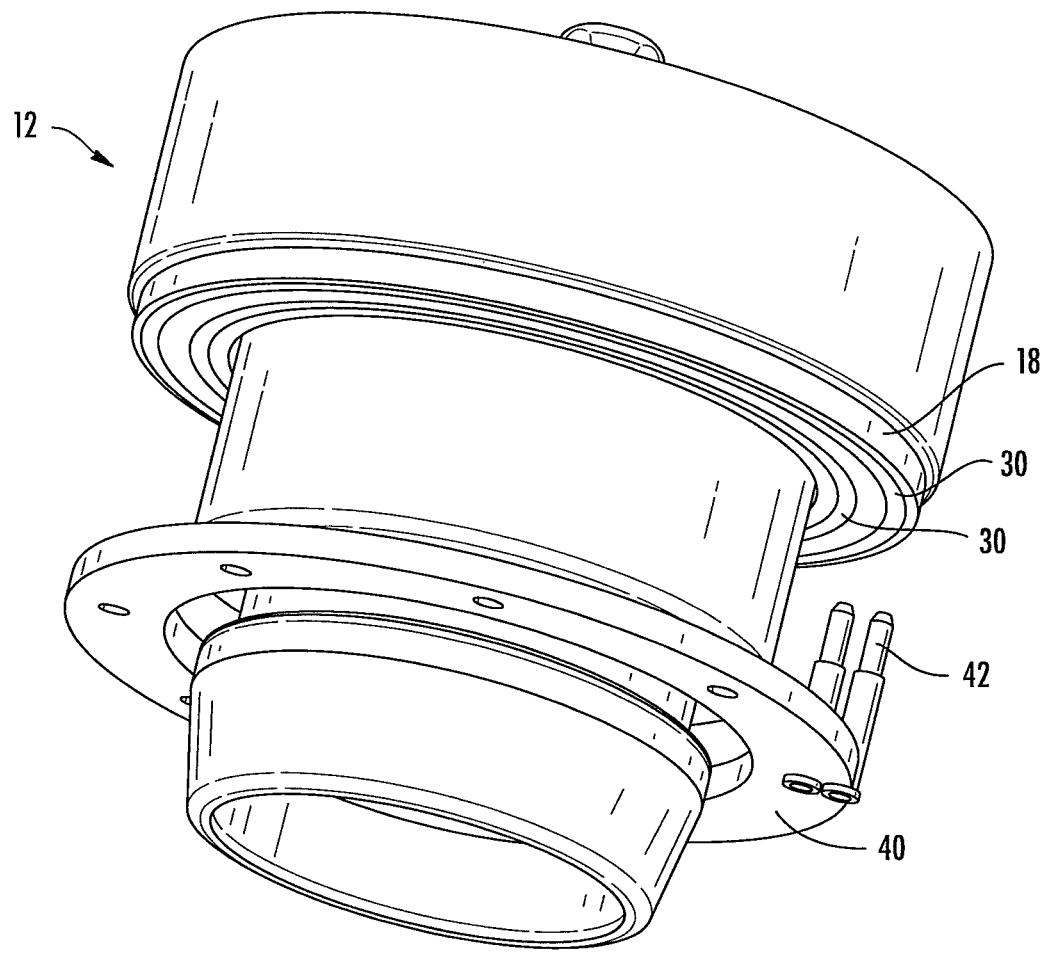
FIG. 8 is an isometric drawing depicting a fluid outlet that having a "two-wire" electronic device.

FIG. 8 is an isometric drawing depicting fluid outlet 12 that utilizes a two-wire electronic device 18. The depicted electronic device 18 includes two concentric ring-shaped contact pads 30 that encircle the fluid flow path. Also depicted is an electrical connector 40 with conductive tines 42. The conductive tines 42 for each contact pad 30 can define a circular arrangement that is azimuthally distributed.

Figure 9:
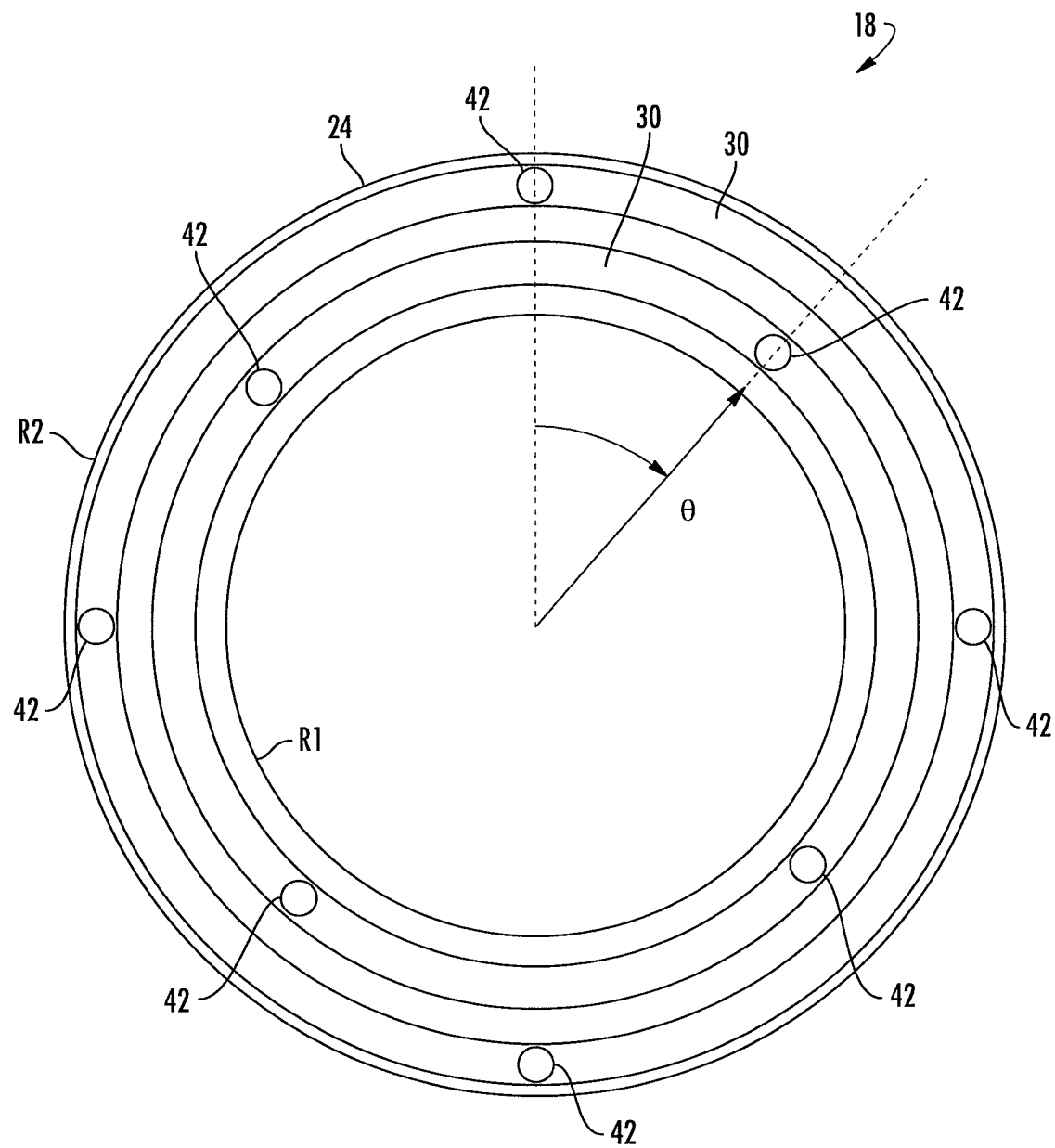
FIG. 9 is a plan view that depicts an electronic device with two concentric ring-shaped electrical contact pads.

FIG. 9 is a plan view that depicts the electronic device 18 with the two-concentric ring-shaped contact pads 30. Contact points between the contact pads 30 and conductive tines 42 are shown as black dots 42. As can be seen, there is an azimuthally distributed arrangement of the tine contact points 42 around each ring-shaped conductive pad 30. For the illustrated outer ring-shaped contact pad 30 the contact points are located at θ=0, 90, 180, and 270 degrees. For the inner ring-shaped contact pad 30 the contact points are at 45, 135, 225, and 315 degrees. Thus this design has four redundant connections for each of the two leads.

Other arrangements for electronic device 18 are possible. For example, the information storage device 26 can have more than four leads 28 and different protocols. The number of contact pads 30 per lead can vary from one to any practical number.

Another example for the electronic device 18 is a four wire device as illustrated schematically in FIG. 2. The contact pads can include two pairs of concentric pads. A first pad is an inner pad (smaller radial range) that spans θ=5 degrees to θ=175 degrees. A second pad is an outer pad (larger radial range) that spans θ=5 degrees to θ=175 degrees. A third pad is an inner pad (smaller radial range) that spans θ=185 degrees to θ=355 degrees. A fourth is an outer pad (larger radial range) that spans θ=185 degrees to θ=355 degrees. Each pad can couple to a plurality of tines that are azimuthally distributed. This is but one example to illustrate possible variation in the design.

The specific embodiments and applications thereof described above are for illustrative purposes only and do not preclude modifications and variations encompassed by the scope of the following claims.

What is claimed:

1. A fluid delivery apparatus comprising:
    a fluid outlet defining an upper fluid flow path and including:
    an upper portion and a lower portion each surrounding the upper fluid flow path;
    a lateral surface between the upper portion and the lower portion and facing downwardly; and
    an electronic device disposed upon the lateral surface and including:
    a substrate;
    an information storage device disposed upon the substrate and storing information pertaining to the fluid delivery apparatus; and
    a plurality of contact pads disposed upon the substrate and facing downwardly to receive a plurality of pressure contacts extending upwardly from the lower portion;
    wherein the contact pads include at least one pad that forms at least a portion of a ring.

2. The fluid delivery apparatus of claim 1 wherein the lateral surface is a ring-shaped surface that surrounds the upper fluid flow path.

3. The fluid delivery apparatus of claim 2 wherein the upper portion defines a first outer radius and the lower portion defines a second outer radius that is less than the first outer radius according to a lateral width of the ring-shaped surface.

4. The fluid delivery apparatus of claim 2 wherein the substrate is ring-shaped and surrounds the upper fluid flow path.

5. The fluid delivery apparatus of claim 1 wherein the information storage device has a plurality of independent leads coupled to the contact pads with at least one independent lead coupled to two or more redundant contact pads, the contact pads are separated from each other to provide independent pressure contacts for the at least one independent lead.

6. The fluid delivery apparatus of claim 1 wherein the contact pads are azimuthally arranged along at least a portion of a circle.

7. The fluid delivery apparatus of claim 1 further comprising a central valve within the fluid outlet that opens when the fluid outlet is coupled to a fluid inlet and closes upon separation.

8. The fluid delivery apparatus of claim 1 further comprising a fluid container for providing fluid to the fluid outlet.

9. The fluid delivery apparatus of claim 1 further comprising a fluid inlet defining a lower fluid flow path and including a plurality of conductive tines, the lower and upper fluid flow paths couple and the conductive tines impinge upon the contact pads when the fluid outlet is coupled to the fluid inlet.

10. The fluid delivery apparatus of claim 9 wherein the impingement of the conductive tines defines an azimuthally distributed set of impingements.

11. A fluid delivery apparatus comprising:
    a fluid outlet defining an upper fluid flow path and including:
    a substantially round upper portion and a substantially round lower portion each surrounding the upper fluid flow path;
    a ring-shaped lateral surface between the upper portion and the lower portion and facing downwardly and surrounding the upper fluid flow path; and
    an electronic device disposed upon the ring-shaped lateral surface and including:
    a substrate;
    an information storage device disposed upon the substrate and storing information pertaining to the fluid delivery apparatus;
    a plurality of leads coupled to the information storage device; and
    a contact pad coupled to each of the plurality of leads and facing downwardly to receive a plurality of pressure contacts extending upwardly from the lower portion;
    wherein the contact pads include at least one contact pad that defines at least a portion of a ring that surrounds the upper fluid flow path.

12. The fluid delivery apparatus of claim 11 wherein the substrate is ring-shaped and surrounds the upper fluid flow path.

13. The fluid delivery apparatus of claim 12 wherein the contact pads are distributed along the ring-shaped substrate and spaced apart according to an azimuthal angle.

14. The fluid delivery apparatus of claim 13 wherein each lead is coupled to at least two different contact pads that are separated from each other by at least one pad coupled to a different lead.

* * * * *